United States Patent
Gamble

(10) Patent No.: US 12,286,226 B2
(45) Date of Patent: Apr. 29, 2025

(54) UNMANNED AERIAL VEHICLE WING PYLON SYSTEM

(71) Applicant: Lockheed Martin Corporation, Bethesda, MD (US)

(72) Inventor: Dustin Eli Gamble, San Luis Obispo, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 40 days.

(21) Appl. No.: 18/312,336

(22) Filed: May 4, 2023

(65) Prior Publication Data

US 2024/0367790 A1  Nov. 7, 2024

(51) Int. Cl.
| | |
|---|---|
| *B64C 39/00* | (2023.01) |
| *B64C 3/18* | (2006.01) |
| *B64C 3/26* | (2006.01) |
| *B64C 3/28* | (2006.01) |
| *B64U 101/60* | (2023.01) |

(52) U.S. Cl.
CPC ............ *B64C 39/029* (2020.01); *B64C 3/185* (2013.01); *B64C 3/187* (2013.01); *B64C 3/26* (2013.01); *B64C 3/28* (2013.01); *B64U 2101/60* (2023.01)

(58) Field of Classification Search
CPC ........... B64C 39/029; B64C 7/02; B64C 3/34; B64U 50/11; B64U 50/12
See application file for complete search history.

(56) References Cited

U.S. PATENT DOCUMENTS

| | | | | |
|---|---|---|---|---|
| 2,550,380 A | * | 4/1951 | Redford | B64D 37/12 89/1.51 |
| 2,832,503 A | * | 4/1958 | Baumann | B64D 37/12 285/422 |
| 3,009,671 A | | 11/1961 | Johnson | |
| 3,147,941 A | | 9/1964 | Hawthorne | |

(Continued)

FOREIGN PATENT DOCUMENTS

| | | |
|---|---|---|
| EP | 2738092 B1 | 1/2017 |
| EP | 3878740 A1 | 9/2021 |

OTHER PUBLICATIONS

Communication with European Search Report for European Application EP24170430.3, Oct. 10, 2024, 13 pages.

(Continued)

*Primary Examiner* — Tye William Abell
*Assistant Examiner* — Justin Michael Heston
(74) *Attorney, Agent, or Firm* — Baker Botts L.L.P.

(57) ABSTRACT

In one embodiment, systems and methods include an aircraft vehicle comprising a body, a first wing coupled to the body, and a second wing coupled to the body, wherein the second wing has a length greater than the first wing, wherein each of the first wing and the second wing comprises a plurality of segments, wherein the second wing comprises a wing pylon system. The wing pylon system comprises one of the plurality of segments of the second wing, a payload, and a pylon coupling the payload to the one of the plurality of segments, the pylon being disposed underneath the one of the plurality of segments, and the payload being disposed underneath the pylon. A center of lift and a center of gravity for the aircraft vehicle are aligned and each is offset from a central axis of the body.

18 Claims, 3 Drawing Sheets

(56) References Cited

U.S. PATENT DOCUMENTS

| | | | | |
|---|---|---|---|---|
| 5,524,847 | A * | 6/1996 | Brodell | B64D 29/02 |
| | | | | 60/797 |
| 7,322,546 | B2 | 1/2008 | Snow, Jr. et al. | |
| 9,266,609 | B1 | 2/2016 | Kunz | |
| 10,183,757 | B2 | 1/2019 | Laguia-Barnola et al. | |
| 10,308,369 | B2 | 6/2019 | Laguia-Barnola et al. | |
| 11,420,761 | B2 * | 8/2022 | Thomas | B64D 27/24 |
| 11,492,097 | B2 | 11/2022 | Daandels et al. | |
| 2011/0127373 | A1 * | 6/2011 | Thomas | B64C 1/34 |
| | | | | 244/65 |
| 2013/0099061 | A1 * | 4/2013 | Grieco | B64C 9/02 |
| | | | | 29/426.1 |
| 2015/0069184 | A1 * | 3/2015 | Barmichev | B64D 37/30 |
| | | | | 244/135 R |
| 2020/0369367 | A1 * | 11/2020 | Philipp | B64C 7/02 |
| 2021/0284438 | A1 * | 9/2021 | Hamad | B65F 1/002 |

OTHER PUBLICATIONS

Anonymous: "Macchi C.202 Folgore—Wikipedia", Mar. 6, 2023 (Mar. 6, 2023), XP093208356, Retrieved from the Internet: URL: https://web.archive.org/web/20230306201248/https://en.wikipedia.org/wiki/Macchi_C.202_Folgore [retrieved on Sep. 24, 2024] whole document.

Anonymous: HBlohm & Voss BV 141—Wikipedia, Apr. 18, 2023 (Apr. 18, 2023), XP093208507, Retrieved from the Internet: URL: https://web.archive.org/web/20230418135713/https://en.wikipedia.org/wiki/Blohm_%26_Voss_BV_141 [retrieved on Sep. 25, 2024] whole document.

Projectair: "Asymmetrical R/C Plane", Oct. 18, 2019 (Oct. 18, 2019), XP093208500, Retrieved from the Internet: URL: https://www.youtube.com/watch?app=desktop&v=ID4KcPpYiR4 [retrieved on Sep. 25, 2024] whole document.

* cited by examiner

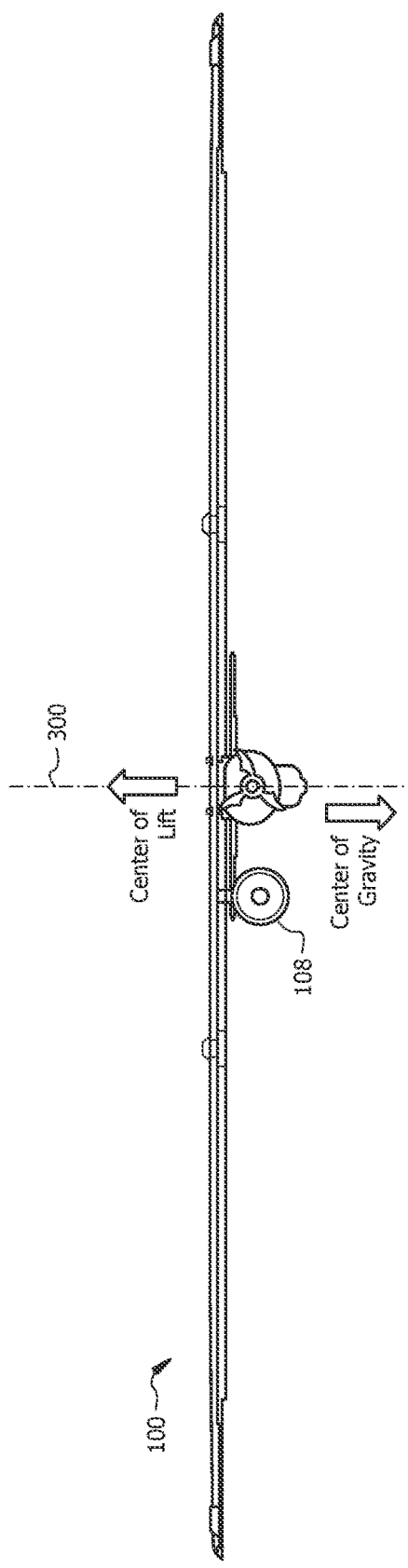
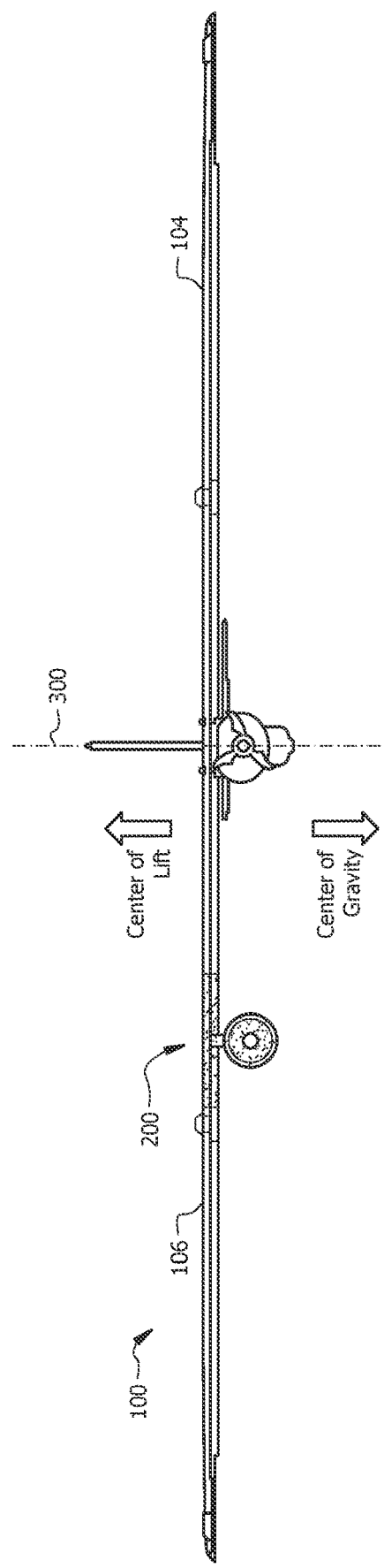

UNMANNED AERIAL VEHICLE WING PYLON SYSTEM

TECHNICAL FIELD

This disclosure generally relates to unmanned aircraft, and more specifically to a wing pylon system for an unmanned aerial vehicle.

BACKGROUND

Traditionally, internal combustion engines have been used to power aircraft. Unmanned aircraft can use batteries and alternate power sources or generators for lower cost, less maintenance, and lower system mass to provide power. Aircraft fuselage and wings are typically designed to support an objective weight and volume. However, as requirements change, there may be problems with additional requisite weight and/or volume.

BRIEF DESCRIPTION OF THE DRAWINGS

To assist in understanding the present disclosure, reference is now made to the following description taken in conjunction with the accompanying drawings, in which:

FIGS. 3A-3B illustrate front views of the example vehicle with the example fuel system, according to certain embodiments.

DETAILED DESCRIPTION

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 3B, where like numbers are used to indicate like and corresponding parts. Described herein are various systems and methods that provide utilization of one or more batteries to power and structurally support an aircraft.

Figure 1:
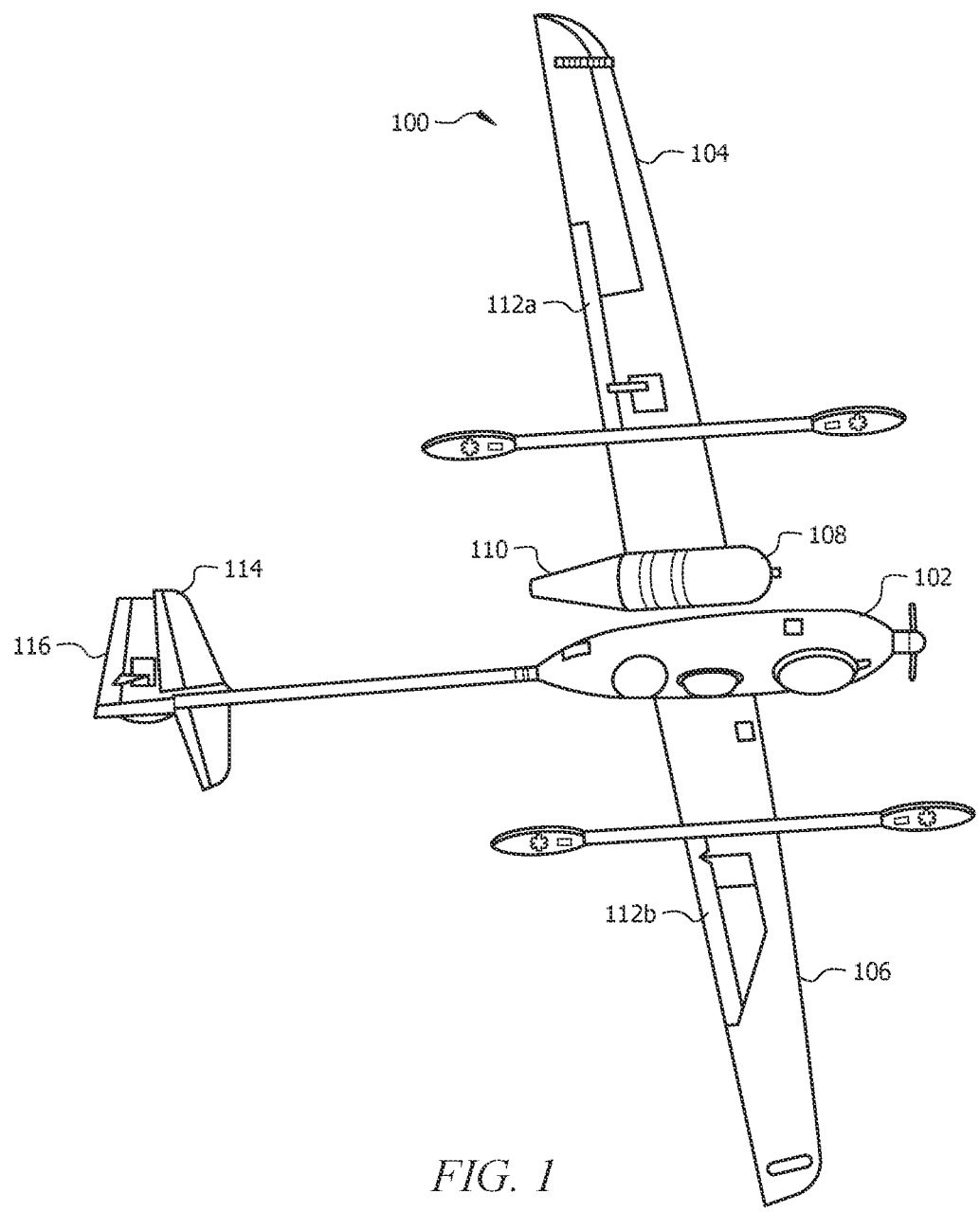
FIG. 1 illustrates an example vehicle, according to certain embodiments.

FIG. 1 illustrates an example vehicle 100. Vehicle 100 may be any suitable vessel configured for transportation, such as an aircraft. Vehicle 100 may include a body 102 (for example, a fuselage), a first wing 104, and a second wing 106. As illustrated, both the first wing 104 and the second wing 106 may be coupled to the body 102, wherein the first wing 104 may be disposed opposite to the second wing 106. The first wing 104 and the second wing 106 may extend laterally away from the body 102 and may be configured to generate lift for the vehicle 100. The vehicle 100 may be any suitable size, height, shape, and any combinations thereof. In embodiments, the body 102 may be cylindrical, and the first wing 104 and the second wing 106 may generally be rectangular. As shown, the vehicle 100 may further comprise a first tank 108.

The first tank 108 may be operable to house or contain a fuel to be used to power the vehicle 100. Without limitations, the first tank 108 may be operable to contain any suitable volume of fuel, such as about 8.6 liters. In embodiments, the fuel may be any suitable fluid for producing energy, such as propane. For example, the first tank 108 may be fluidly connected to the body 102 and operable to direct the fuel to the body 102 to be consumed to produce energy. As illustrated, the first tank 108 may be disposed along the first wing 104. In one or more embodiments, the first tank 108 may alternatively be disposed along the second wing 106 rather than the first wing 104. Without limitations, the first tank 108 may be secured to the first wing 104 or second wing 106 through any suitable method, including through the usage of fasteners, welding, adhesives, interlocking components, interference fit, and any combination thereof. In embodiments, suitable fasteners may include studs, bolts, nuts, washers, screws, nails, rivets, brackets, clamps, and the like. In one or more embodiments, the first tank 108 may be configured to house any suitable payload to be transported by the vehicle 100 rather than to contain fuel for consumption by the vehicle 100.

The first tank 108 may be offset from the body 102 by a suitable distance. The first tank 108 may be any suitable size, height, shape, and any combinations thereof. With reference to FIG. 1, the first tank 108 may be generally in a cylindrical shape. In embodiments, the first tank 108 may comprise any suitable materials, including, but not limited to, metals, nonmetals, polymers, ceramics, composites, and any combinations thereof. Without limitations, the first tank 108 may comprise carbon fiber material. The first tank 108 may comprise a tail cone 110 disposed at a distal end of the first tank 108 configured to improve the aerodynamics of the air flow around first tank 108 as the vehicle 100 is in flight.

As illustrated, the vehicle 100 may further comprise one or more ailerons 112, a first tail stabilizer 114, and a second tail stabilizer 116. The one or more ailerons 112 may be configured to configured to deflect upwards and downwards. The one or more ailerons 112 may each be a hinged flight control surface forming part of the trailing edge of each wing an aircraft. The one or more ailerons 112 may be used in pairs to control the aircraft in roll (or movement around the aircraft's longitudinal axis). For example, there may be at least one aileron 112a disposed on the first wing 104 and at least one aileron 112b disposed on the second wing 106. The ailerons 112a, 112b may operate as a pair such that when one is moved downward, the other is moved upward, wherein the down-going aileron may increase the lift on its respective wing while the up-going aileron may reduce the lift on its respective wing, producing a rolling moment about the longitudinal axis of the vessel 100.

The first tail stabilizer 114 and the second tail stabilizer 116 may each be disposed behind or distal to the body 102 and securably coupled to the body 102. In embodiments, the first tail stabilizer 114 may be a horizontal stabilizer for the vessel 100. The first tail stabilizer 114 may be used to maintain the vessel 100 in longitudinal balance (or "pitch"). The first tail stabilizer 114 may exert a vertical force at a distance from body 102 for a desired summation of pitch moments about the center of gravity of zero. The vertical force exerted by the first tail stabilizer 114 may vary with flight conditions, in particular according to the aircraft lift coefficient and wing deflection which affect the position of the center of pressure, and with the position of the center of gravity (which may change with aircraft loading and fuel consumption). The second tail stabilizer 116 may be a vertical stabilizer. The second tail stabilizer 116 may provide directional (or "yaw") stability and may comprise a fixed fin and movable control rudder hinged to the fin's rear edge.

While the example of vehicle 100 will be used throughout this disclosure as an example application of the methods and systems described herein, any suitable apparatus or structure onto which the first tank 108 may be incorporated into is also contemplated in this disclosure. For example, vehicle 100 may be any type of vehicle, including an aircraft, a landcraft, a watercraft, a train, a hovercraft, and a helicopter.

Figure 2A:
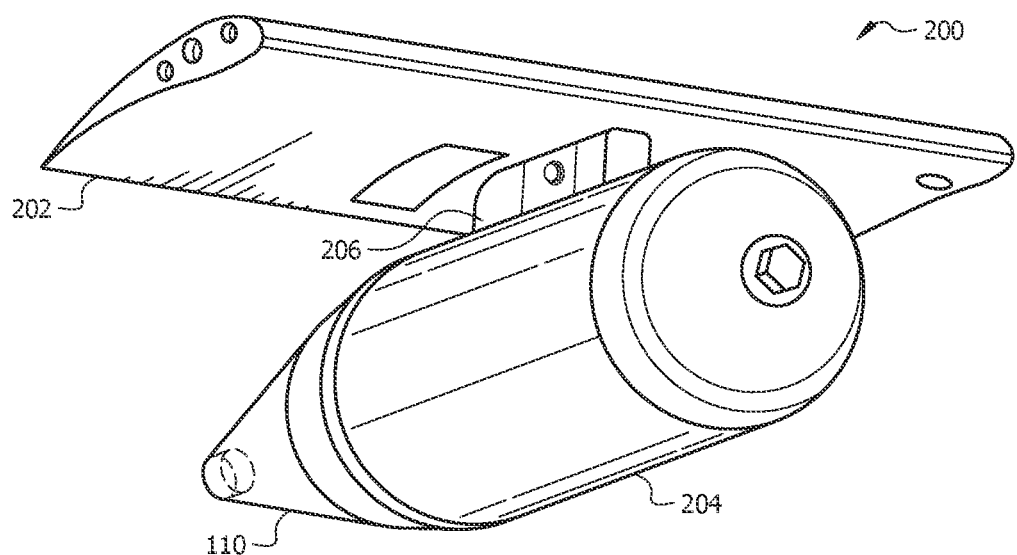
FIGS. 2A-2B illustrate an example wing pylon system for the example vehicle in FIG. 1, according to certain embodiments.
Figure 2B:
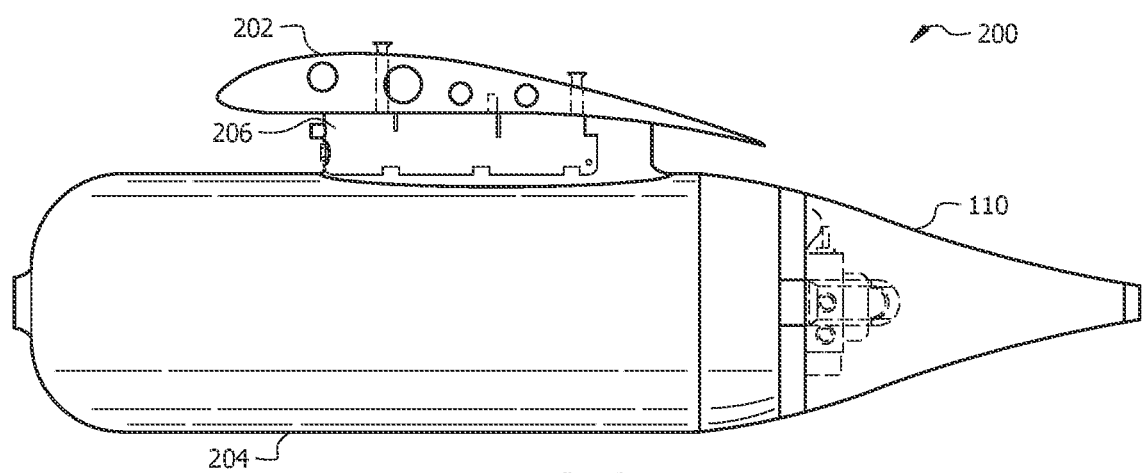

FIGS. 2A-2B illustrate an example wing pylon system 200 for the vehicle 100 (referring to FIG. 1). The wing pylon system 200 may be a modular component configured for integration into the first wing 104 (referring to FIG. 1) and/or the second wing 106 (referring to FIG. 1). For example, the first wing 104 and/or the second wing 106 may structurally comprise a plurality of segments (discussed further below) spanning across the length of each respective wing and constituting the make-up of said wing. In one or more embodiments, the wing pylon system 200 may be designated as one of those plurality of segments and may be incorporated into the first wing 104 and/or second wing 106.

As illustrated, the wing pylon system 200 may comprise a wing segment 202, a payload 204, and a pylon 206. The wing segment 202 may be a portion of the first wing 104 or the second wing 106. The wing segment 202 may comprise any suitable length of the first wing 104 or the second wing 106. In embodiments, the first wing 104 and/or second wing 10 may be divided or partitioned into a plurality of segments (wherein the wing segment 202 is one of the plurality of segments) to be coupled or secured together to form said wing structure. The wing segment 202 may comprise substantially the same or similar dimensions as the remaining plurality of segments. The wing segment 202 may be configured to couple to the body 102 (referring to FIG. 1) of the vehicle 100 and/or the remaining plurality of segments for either the first wing 104 or second wing 106. In embodiments, the wing segment 202 may be coupled and securely incorporated within the first wing 104 or second wing 106 through any suitable method, including through the usage of fasteners, welding, adhesives, interlocking components, interference fit, and any combination thereof. In embodiments, suitable fasteners may include studs, bolts, nuts, washers, screws, nails, rivets, brackets, clamps, and the like.

In embodiments, the pylon 206 may be disposed underneath the wing segment 202. In one or more embodiments, the pylon 206 may be disposed about any other suitable location along the wing segment 202, such as on top of, in front of, or behind the wing segment 202. The pylon 206 may be configured to connect the frame of an aircraft (i.e., one of first wing 104 or second wing 106) to an item or object that is being carried (such as the payload 204). In one or more embodiments, the pylon 206 may be secured to an underside of the wing segment 202 through one or more fasteners, through welding, or through a combination thereof. The pylon 206 may be designed to be aerodynamic to reduce air resistance. Pylon 206 may be any suitable size, height, shape, and any combinations thereof. In further embodiments, the pylon 206 may comprise any suitable materials, including, but not limited to, metals, nonmetals, polymers, ceramics, composites, and any combinations thereof. Without limitations, pylon 206 may be a wedge adaptor or stub-wing pylon. The pylon 206 may be configured to securely attach the payload 204 to the vehicle 100.

In one or more embodiments, the payload 204 may be disposed underneath the pylon 206. In one or more embodiments, the payload 204 may be disposed about any other suitable location along the pylon 206. The payload 204 may be secured to the pylon 206 through one or more fasteners, through welding, or through a combination thereof. In embodiments, the payload 204 may be the first tank 108 configured to contain fuel for the vessel 100, as described above. In other embodiments, the payload 204 may be configured to house any suitable payload to be transported by the vehicle 100 rather than to contain fuel for consumption by the vehicle 100. Similar to the first tank 108, the payload 204 may be any suitable size, height, shape, and any combinations thereof. In further embodiments, the payload 204 may comprise any suitable materials, including, but not limited to, metals, nonmetals, polymers, ceramics, composites, and any combinations thereof. As shown, the payload 204 may comprise the tail cone 110, wherein the tail cone 110 is disposed at a distal end of the payload 204 configured to improve the aerodynamics of the air flow around the payload 204 as the vehicle 100 is in flight. In embodiments, the tail cone 110 may extend away from the payload 204.

FIGS. 3A-3B illustrate a comparison of front views of the vehicle 100 with and without the wing pylon system 200. For example, the vehicle 100 illustrated in FIG. 3A does not include the wing pylon system 200, and the vehicle 100 illustrated in FIG. 3B does include the wing pylon system 200. Further in this example, the vehicle 100 in FIG. 3A may have 3 partitioned wing segments for each wing, and the second wing 106 in FIG. 3B may have 4 partitioned wing segments, wherein one of them is the wing pylon system 200. In one or more embodiments, the vehicle 100 may typically comprise a center of lift and a center of gravity aligned with a central axis 300 of the vehicle 100. With the inclusion of a first tank 108 (referring to FIG. 1) or any other similar payload, the center of gravity may laterally shift and be offset from the central axis 300, as illustrated in FIG. 3A. As the center of lift and the center of gravity are misaligned, problems with operating vehicle 100 may arise, such as with balance and stability of the vehicle 100. The vehicle 100 may incorporate the wing pylon system 200 rather than comprise the first tank 108. By including the wing pylon system 200, the payload 204 (referring to FIGS. 2A-2B) may function as the first tank 108. The respective wing incorporating the wing pylon system 200 may comprise a greater length than that which does not incorporate the wing pylon system 200. For example, the second wing 106 may comprise a greater length than the first wing 104 with the inclusion of the wing pylon system 200, as illustrated in FIG. 3B. Further, the integration of the wing pylon system 200 with the second wing 106 may increase the wing lift and may move both the center of gravity and the center of lift in a symmetric direction to balance the lift and weight of vehicle 100.

The second wing 106 comprising the wing pylon system 200 may offset the weight impact to said wing. In embodiments, if the loading to a given wing increases, then that wing needs to work harder and will need to fly faster, thereby creating more drag. The addition of the wing pylon system 200 may offset the impact of the weight and keep the wing loading to below or substantially equal to that of an original aircraft without extra loading. In these embodiments, the vehicle 100 may further comprise a first tail stabilizer 114 (referring to FIG. 1) with an increased size to accommodate the offset centers of gravity and lift. For example and without limitations, the area of the second wing 106 of vehicle 100 without any extra loading (i.e., with first tank 108) may be about 13.8 $ft^2$, the weight of the vehicle 100 may be about 48 lbs, and the wing loading for the second wing 106 may be 3.5 $lb/ft^2$. For a vehicle 100 with extra loading, such as with the first tank 108 attached to the second wing 106, the center of gravity may be offset, the weight of the vehicle 100 may be increased to about 54 lbs, and the wing loading for the second wing 106 may be 3.9 $lb/ft^2$. For a vehicle 100 having the wing pylon system 200 included in the second wing 106, the area of the second wing 106 may be about 15.8 ft$^2$, the weight of the vehicle 100 may be about 54 lbs, and the wing loading for the second wing 106 may be 3.4 lb/ft$^2$.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An unmanned aerial vehicle, comprising:
a body;
a first wing coupled to the body; and
a second wing coupled to the body and disposed opposite to the first wing, wherein the second wing has a length greater than the first wing, wherein each of the first wing and the second wing comprises a plurality of segments, wherein the second wing comprises a wing pylon system, wherein the wing pylon system comprises:
a wing segment being one of the plurality of segments of the second wing, wherein the wing segment is disposed between the body and another one of the plurality of segments of the second wing located at a distal end of the second wing;
a tank configured to contain a fuel to be used to sufficiently power the unmanned aerial vehicle, wherein the fuel is propane; and
a pylon coupling the tank to the wing segment, wherein the pylon is disposed underneath the wing segment, and wherein the tank is disposed underneath the pylon,
wherein a center of lift and a center of gravity for the unmanned aerial vehicle are each offset from a central axis of the body, and wherein the center of lift and the center of gravity are aligned.

2. The unmanned aerial vehicle of claim 1, further comprising:
at least one aileron disposed on the first wing configured to deflect upwards and downwards; and
at least one aileron disposed on the second wing configured to deflect upwards and downwards.

3. The unmanned aerial vehicle of claim 1, wherein the tank is configured to contain a volume of about 8.6 liters of the fuel.

4. The unmanned aerial vehicle of claim 1, further comprising:
a horizontal tail stabilizer disposed behind the body and securably coupled to the body; and
a vertical tail stabilizer disposed behind the body and securably coupled to the body, wherein the horizontal tail stabilizer is larger than the vertical tail stabilizer.

5. The unmanned aerial vehicle of claim 1, wherein the second wing comprises a greater number of the plurality of segments than the first wing.

6. The unmanned aerial vehicle of claim 1, wherein the wing pylon system consists of the wing segment, the tank, and the pylon.

7. The unmanned aerial vehicle of claim 1, wherein the pylon is secured to an underside of the wing segment through welding, wherein the tank is secured to the pylon through welding.

8. The unmanned aerial vehicle of claim 1, wherein the wing pylon system further comprises a tail cone coupled to the tank extending away from the tank.

9. An unmanned aerial vehicle, comprising: a body; a first wing coupled to the body; and a second wing coupled to the body and disposed opposite to the first wing, wherein the second wing comprises a plurality of segments and a wing pylon system, wherein the second wing has a length greater than the first wing, wherein the wing pylon system comprises: a wing segment being one of the plurality of segments of the second wing, wherein the wing segment is disposed between the body and another one of the plurality of segments of the second wing located at a distal end of the second wing; a tank configured to contain a fuel to be used to sufficiently power the unmanned aerial vehicle, wherein the fuel is propane; and a pylon coupling the tank to the wing segment, wherein the pylon is disposed underneath the wing segment, and wherein the tank is disposed underneath the pylon.

10. The unmanned aerial vehicle of claim 9, further comprising at least one aileron disposed on the first wing configured to deflect upwards and downwards.

11. The unmanned aerial vehicle of claim 10, further comprising at least one aileron disposed on the second wing configured to deflect upwards and downwards.

12. The unmanned aerial vehicle of claim 9, wherein the wing pylon system consists of the wing segment, the tank, and the pylon.

13. The unmanned aerial vehicle of claim 9, wherein the tank is configured to contain a volume of about 8.6 liters of the fuel.

14. The unmanned aerial vehicle of claim 9, wherein the wing pylon system further comprises a tail cone coupled to the tank extending away from the tank.

15. An unmanned aerial vehicle comprising: a body; a first wing coupled to the body; and a second wing coupled to the body and disposed opposite to the first wing, wherein the second wing comprises a plurality of segments and a wing pylon system, wherein the wing pylon system comprises: a wing segment being one of the plurality of segments of the second wing, wherein the wing segment is disposed between the body and another one of the plurality of segments of the second wing located at a distal end of the second wing; a tank configured to contain a fuel to be used to sufficiently power the unmanned aerial vehicle, wherein the fuel is propane; and a pylon coupling the tank to the wing segment, wherein the pylon is disposed underneath the wing segment, wherein the tank is disposed underneath the pylon, and wherein a center of lift and a center of gravity for the unmanned aerial vehicle are each offset from a central axis of the body and are aligned.

16. The wing pylon system of claim 15, wherein the pylon is secured to an underside of the segment through one or more fasteners or welding, wherein the tank is secured to the pylon through additional one or more fasteners or welding.

17. The wing pylon system of claim 15, wherein the tank is configured to contain a volume of about 8.6 liters of the fuel.

18. The wing pylon system of claim 15, wherein the wing pylon system consists of the segment of the wing, the tank, the pylon, and a tail cone coupled to the tank extending away from the tank.

* * * * *